(12) United States Patent
McMullen et al.

(10) Patent No.: US 9,712,664 B1
(45) Date of Patent: Jul. 18, 2017

(54) SUSTAINED SERVICE SUBSCRIPTIONS

(71) Applicant: Sprint Communications Company L.P., Overland Park, KS (US)

(72) Inventors: Michael P. McMullen, Leawood, KS (US); Mark D. Peden, Olathe, KS (US); Raymond Reeves, Oviedo, FL (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 14/988,723

(22) Filed: Jan. 5, 2016

(51) Int. Cl.
| | | |
|---|---|---|
| *H04M 11/00* | (2006.01) | |
| *G06Q 40/00* | (2012.01) | |
| *G06Q 20/14* | (2012.01) | |
| *H04M 1/725* | (2006.01) | |
| *H04W 8/18* | (2009.01) | |
| *H04L 29/08* | (2006.01) | |
| *H04M 15/00* | (2006.01) | |

(52) U.S. Cl.
CPC ...... *H04M 1/72577* (2013.01); *H04L 67/306* (2013.01); *H04M 15/67* (2013.01); *H04M 15/68* (2013.01); *H04M 15/83* (2013.01); *H04W 8/18* (2013.01)

(58) Field of Classification Search
CPC ...... G06Q 20/40; G06Q 40/025; G06Q 20/02; G06Q 20/204; G06Q 30/0222; G06Q 20/24; G06Q 20/4037; G06Q 20/42; G06Q 30/0233; G06Q 20/10; G06Q 30/0267; G06Q 30/0625; G06Q 30/0633; G06Q 20/3223; G06Q 20/3276; G06Q 20/3278; G06Q 20/04; G06Q 20/14; G06Q 40/00; H04L 63/083
USPC ............... 455/406–407, 414.1; 705/2, 39–42
See application file for complete search history.

(56) References Cited

U.S. PATENT DOCUMENTS

| | | | |
|---|---|---|---|
| 2010/0332383 A1* | 12/2010 | Frazier | G06Q 20/04 705/40 |
| 2011/0302077 A1* | 12/2011 | Lundgren | G06Q 20/10 705/39 |
| 2013/0085936 A1* | 4/2013 | Law | G06Q 20/04 705/40 |
| 2013/0110943 A1* | 5/2013 | Menon | G06Q 10/107 709/206 |
| 2014/0081853 A1* | 3/2014 | Sanchez | G06Q 20/40 705/40 |
| 2015/0058026 A1* | 2/2015 | Hoeller | G06F 19/327 705/2 |
| 2015/0242862 A1* | 8/2015 | Rupple | G06Q 30/018 705/317 |

(Continued)

*Primary Examiner* — Khawar Iqbal

(57) ABSTRACT

Systems and methods discussed herein are employed in a cross-platform notification system configured to send a series of notifications to devices and/or subscription services associated with an account where a payment is due. These notifications may be sent to an increasing number of devices and/or subscription services as time passes from when payment was due, and the iterations of notifications may take up progressively more of a graphical user interface and/or be displayed for an increasing period of time until a final notification is sent, after which point access to telecommunications services and subscription services, except for emergency functions, accessed through the telecommunications service provider are no longer available to users associated with the overdue account.

20 Claims, 6 Drawing Sheets

(56) References Cited

U.S. PATENT DOCUMENTS

| | | | | |
|---|---|---|---|---|
| 2016/0125524 A1* | 5/2016 | Loskamp | ............... | G06Q 40/00 |
| | | | | 705/35 |
| 2016/0180334 A1* | 6/2016 | Kassemi | .............. | G06Q 20/385 |
| | | | | 705/65 |
| 2016/0344873 A1* | 11/2016 | Jenzeh | ................ | H04M 15/866 |
| 2017/0011373 A1* | 1/2017 | Todasco | ................ | G06Q 20/14 |

* cited by examiner

SUSTAINED SERVICE SUBSCRIPTIONS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Individual and corporate customers of telecommunications service providers may contract with the provider for a variety of services, some provided directly by and solely from the provider, and some which may be provided by a third party but accessed through the telecommunications service provider's data, voice, and other services. The customers may receive a single bill for services, or may pay multiple bills to parties including the telecommunications service provider. These bills may be received in a paper or paperless manner, and various services may be rendered inaccessible if a customer fails to pay their bill in a timely fashion.

SUMMARY

In an embodiment, a method of maintaining telecommunications service comprising: sending, by an application stored in a non-transitory memory, based on a determination that payment is due on a user account, an initial payment notification to at least one device associated with the user account, wherein the at least one user device comprises a mobile phone and is associated with a telecommunications service provider, wherein the initial payment notification is displayed on a first portion of a graphic user interface of the mobile phone, and wherein the user account is associated with the mobile phone and a plurality of subscription services; based on a determination that a satisfactory payment has not been received within the predetermined period of time, at least one of modifying, by the application, at least one of the plurality of subscription services, wherein modifying the at least one of the plurality of services comprises at least one of restricting access to a graphic user interface when the request for access to the at least one subscription service is received and restricting a functionality of the at least one subscription service; and sending, by the application, at least one elevated payment notification to the mobile phone and an at least one subscription service of the plurality of subscription services, wherein the elevated payment notification is displayed on a second portion of the mobile phone, wherein the second portion is greater than the first portion, and wherein the elevated payment notification is displayed in response to a request for access to the at least one subscription service. The embodiment further comprising: sending, by the application, a final payment notification in response to a determination that a satisfactory payment has not been made within a predetermined time period of the at least one elevated payment notification; and disabling, by the application, in response to a determination that a satisfactory payment is not received within a predetermined time period after the final payment notification is sent, access to the mobile phone and the plurality of subscription services.

In an embodiment, a system for maintaining telecommunications service comprising a data store stored in a non-transitory memory of a server and comprising a plurality of user accounts, wherein each user account of the plurality of user accounts are associated with at least one user, at least one device, and a plurality of subscription services; a payment notification application stored in the non-transitory memory that, when executed by a processor; sends, to a first device associated with the user account, an initial payment notification wherein the initial payment notification is displayed on a first portion of a graphic user interface of the first device; based on a determination that a satisfactory payment has not been received within an initial time period, at least one of modifies access to at least one subscription service by at least one of restricting access to a graphic user interface when the request for access to the at least one subscription service is received and restricting a functionality of the at least one subscription service and sends, to the first device and a second device associated with the user account, based on a determination that satisfactory payment has not been received within an initial time period, a subsequent payment notification, wherein the first device and the second device comprise different types of devices, wherein the subsequent payment notification is displayed on a second portion of the graphical user interface, wherein the second portion is greater than the first portion. In an embodiment, the payment notification application sends, to at least one subscription service of the plurality of subscription services associated with the user account, based on a determination that satisfactory payment has not been received within a second time period, a second subsequent payment notification, wherein the second subsequent payment notification is displayed on a graphical user interface of a device configured to access the at least one subscription service in response to execution of the at least one subscription service; sends, to the first device and the second device and to the at least one subscription service, a final payment notification in response to a determination that a satisfactory payment has not been made within a predetermined time period of the second subsequent payment notification; and disables, by the application, in response to a determination that a satisfactory payment is not received within a predetermined time period after the final payment notification is sent, access to the plurality of subscription services and the first device and the second device.

In an alternate embodiment, a method of maintaining telecommunications service comprising sending, by an application stored in a non-transitory memory, based on a determination that payment is due on a user account, an initial payment notification to at least one device associated with the user account, wherein the initial payment notification is displayed on a first portion of a graphic user interface of the at least one device, wherein the at least one device comprises a mobile phone, and wherein the user account is associated with the mobile phone and a plurality of subscription services; based on a determination that a satisfactory payment has not been received within the predetermined period of time, at least one of modifying, by the application, at least one of the plurality of subscription services, wherein modifying the at least one of the plurality of services comprises at least one of restricting access to a graphic user interface when the request for access to the at least one subscription service is received or restricting a functionality of the at least one subscription service; and sending, by the application, at least one elevated payment notification to the mobile phone and at least two other devices associated with the user account, based on at least one attribute associated with the mobile phone and each of the at least two other devices, wherein the at least one elevated payment notification is displayed on a second portion of a graphical user interface of the mobile phone and each of the at least two other devices, wherein the second portion is greater than the first portion; sending, by the application, a final payment notification in response to a determination that a satisfactory payment has not been made within a predetermined time period of the at least one elevated payment notification, wherein the final payment notification is sent to the mobile phone, the at least two other devices and a subset of the plurality of subscription services associated with the user account; and disabling, by the application, in response to a determination that a satisfactory payment is not received within a predetermined time period after the final payment notification is sent, access to the mobile phone and the at least two other and the plurality of subscription services.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
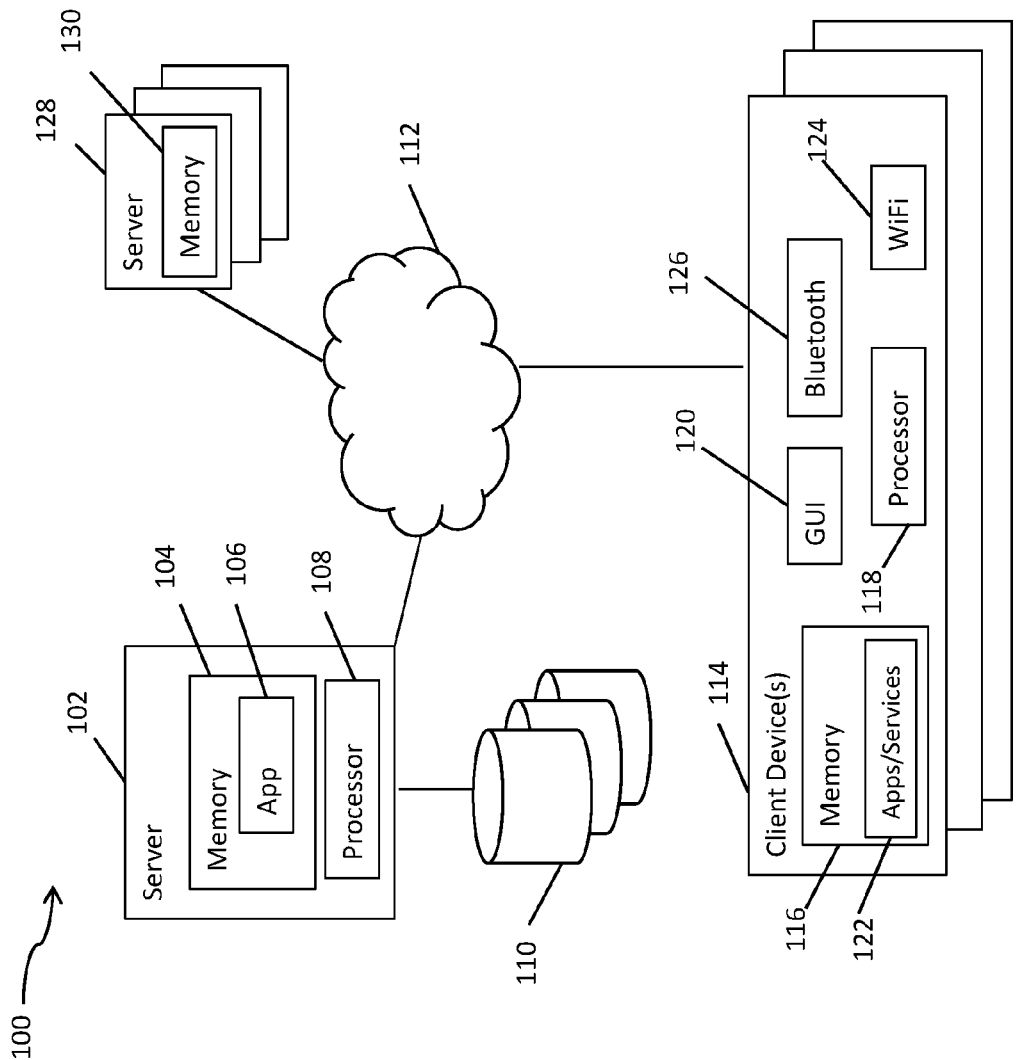
FIG. 1 is a block diagram of a system according to embodiments of the present disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Companies such as telecommunications service providers may provide support including data and voice services, to individuals, groups, and enterprises. This support may come in the form of contracted services for support of user equipment including portable communication devices, laptops, tablets, desktops, kiosks, phones, and other devices. Telecommunications service providers may also provide support for and subscriptions to third party applications or services, including email, billing, finance, internet service, data communication services, design, messaging, retail, advertising, and other applications which may collectively be referred to as "subscription services." Subscription services may be provided by sources including retailers, other telecommunications service providers, marketing corporations, as well as other national and international entities that may provide services for retail, entertainment, sports, business, healthcare, and other industries. Access to these subscription services may be provided individually or in bundles, and a user account associated with these services may be billed individually or for the bundle (package) at predetermined intervals. In one example, a user account may receive multiple bills for subscription services and telecommunications services. If one or more bills associated with the user account are delinquent in payment as discussed herein, other services associated with the user account may be restricted, suspended, or otherwise interrupted unless and/or until satisfactory payment is made towards the delinquent bill. In some embodiments, since the subscription services may be tied to a user account that also contracts telecommunications services from the telecommunications services provider, and if a payment is delinquent on a subscription services bill, the telecommunications services may also be interrupted and vice-versa. That is, failure to pay a third party's bill for subscription services may impact services supported by the telecommunications service provider (voice, data, apps, etc.). In one example, if a bill for a subscription service for a retail site is not paid, access to an email account (subscription service) or voice/data services (telecommunications services provider) may also be impacted/restricted unless and until the delinquent bill is settled.

In an embodiment, in the event that a user account is delinquent in bill payment of at least one bill associated with the account, the telecommunications service provider may desire to notify the user prior to shutting down some or all services or access to the supported devices and associated voice and data services. If device or services access is shut off, the user may not be able to pay the account or receive notifications that the account is overdue. The systems and methods discussed herein provides an advantage over conventional payment notification systems because, conventionally, a user who's device is shut down due to non-payment may also be unable to access their email account that would have the notification if device support is down, and may not know to attempt email access from a non-supported device, or may have that access shut down as well due to non-payment. While this may be a challenge for an individual user, or even for a user with a smaller group user account for multiple family members, it can shut down entire businesses including supply chains and customer support.

Delinquent payments, as discussed herein, may refer to payments for telecommunications services (e.g., device support) as well as access to subscription services. Since the telecommunications service provider is the nexus for both device support and subscription services access and support, a cross-platform method of notification, escalation, and restoration of access may be employed according to embodiments of the present disclosure in order to notify users of delinquent payments. "Cross-platform" is the term used herein to describe the systems and methods that disseminate payment notifications and enable payments to be made by displaying notifications on user devices and/or on subscription services to remind users to pay and to enable payment through the use of a link or other access point provided in the notification. In one example, if a payment is late for telecommunications services associated with a user account that is also associated with subscription services, attempts to access the subscription services my result in presentation of the link to payment of the bill for the telecommunications services, and access to some or all of the subscription services may be altered, restricted, or otherwise interrupted as discussed herein. It is appreciated that the systems and methods discussed herein may be employed for payment notification prior to a missed payment, after a payment is due, e.g., when a payment is missed it may be considered delinquent within a predetermined time of the due date of the payment, as well as for notifications sent when an account and payments associated with the account are not paid by or within a predetermined window of the due date.

In an embodiment, the cross-platform notification may be employed to keep an enterprise afloat by maintaining telecommunications voice and data services as well as subscription services. For example, if an enterprise contracts with a telecommunication services provider for its services as well as subscription services, communication channels such as email and messaging may be linked to payments made to the provider. The enterprise may comprise an accounting department including accounts payable, accounts receivable, and other departments, and employees in accounting in addition to other departments may have permission and access to pay provider bills. Using the cross-platform notification system and methods discussed herein, the employees who have permission and access to pay the bills may be able to more readily receive notifications that payment is due in a timely fashion. In addition, employees or others who are in contact with and/or who report to or who are in charge of those employees who have permission and access to pay the bills may receive notifications in order to increase the likelihood that those with permission and access pay the bill(s) so that telecommunication services and subscription services that support the enterprise, such as email and messaging services, are not interrupted.

In an embodiment, a user account is created when an individual user subscribes for device support for one or more devices from a telecommunications service provider, "Provider X," as well as for a plurality of subscription services that may be provided individually or as a bundle through Provider X from Subscription Service Providers L, K, and T, for corresponding subscription services L, K, and T. That is, the subscription service providers are not the same as Provider X, but rather use Provider X as a conduit through which to provide subscription services to users/customers of Provider X. If a payment for the user account is not received within a predetermined number of days of a predetermined due date, an initial payment notification may be sent to the user through a contact email or messaging subscription services tied to the device and/or the user's account. This initial notification may restrict access to a device or devices associated with the user's account, for example, by taking up a portion, such as 33%, of the user's screen for a predetermined time period.

If no payment is received, or if less than a satisfactory payment is received within a predetermined time period of the initial notification, which may also be defined in terms of a second predetermined time period based on the payment due date, a subsequent notification is sent by Provider X. A "subsequent notification" may be any notification sent after an initial payment notification sent in response to a first missed payment date, and may also be referred to interchangeably as an "elevated notification." A "satisfactory payment" may be any form of or percentage of a total payment due that is considered, based on the terms of the contract with the telecommunications service provider, to be sufficient to maintain/restore some or all services associated with the account. This subsequent (elevated) notification may take up an increased percentage of the graphical user interface, and further iterations of elevated notifications sent in the same manner may progressively restrict access to the user's device or devices until a final notification is sent that takes up, for example, 90% of the graphical user interface and only permits access to emergency functions. As used herein, "emergency functions" may be defined as emergency services access, including voice and data services employed to contact E-911 and 911, customer services access (to pay the bill), as well as access to certain contacts that may have been previously designated as emergency contacts by the user.

If no payment is received within a predetermined period of the final notification, which may also be defined in terms of a second predetermined time period based on the payment due date, device access continues to be restricted. A user account may be associated with a severity level prior to a payment due date, and in some cases based upon a payment history, and may be associated with a different severity level after the payment is missed, after an initial payment notification, after each iteration of elevated notifications, and after the final notification is sent. The severity level may be employed in addition to or instead of the attributes discussed herein to determine the impact (percent and duration of device screen blockage, subscription service modification) of each payment notification. As used herein, the term "payment notification" is employed to reference a notification, message, alert, or other mechanism that is visual and/or audio and/or physical (vibration of a device) intended to convey information to a user or users that payment is coming due, due, or past due, as discussed in detail herein.

In an embodiment, in addition to the initial and elevated notifications sent to the user's device or devices associated with the user account and supported by Provider X, at least some of the subscription services may also be sent notification and may display the same or similar payment notifications in a progressive, iterative manner when a user attempts to access the subscription service from any device, regardless of whether the device is supported by Provider X. In this example, subscription services access for subscription services associated with the user account is initially restricted for predetermined periods of time while the notifications are displayed, until access is ultimately shut down.

Notifications may be displayed over an increasing percentage of a device's user interface, and may be displayed when the user attempts to access one or more services associated with the account. In this example, the user may view these notifications not only when they attempt to access the subscription services on devices that are supported by Provider X, but also on those supported by Provider Y. That is, in the first example, the device(s) supported by Provider X, with whom the user account has a contract for services, may be a tablet or mobile phone, and in this example, the device(s) may comprise a laptop computer at home or at work that may not be supported by Provider X but by Provider Y. Those devices supported by Provider Y may still be used to send payment notifications to a user based upon the log-in information or other information associated with the user's activity on the subscription services accessed using those devices. Using this cross-platform method, a user has multiple opportunities to receive a notification regarding payment both before and after the payment is due via both their device(s) (e.g., the graphical user interface) as well as through any or all of subscription services L, K, or T or services associated with the account. In some embodiments, the notifications displayed when a user attempts to access (execute) subscription services L, K, and T may provide a link or other avenue by which the payment can be settled.

In an alternate embodiment, Provider X is contracted with an enterprise to support an enterprise's telecommunications systems, including a plurality of portable and stationary devices that may be associated with different users or departments/groups within the enterprise. The enterprise may also subscribe to bundled or single subscription services, including, for example, an email service through subscription service K. In this embodiment, the enterprise may receive a pre-payment notification (reminder) prior to a payment due date, this notification may be sent to an administrator or a group of designated employees or managers, e.g., those users identified as having either the authority to receive the notification or the authority to pay the bill. If a payment is due and a satisfactory payment is not received from the enterprise for either the telecommunications services or the subscription services, which may be billed separately or as a bundle, an initial payment notification may be sent by the telecommunications service provider.

The initial payment notification may be sent to the same administrator or group as the pre-payment due date notification is sent to. In alternate embodiments, the initial notification may be sent to a tier of users instead of or in addition to those who received the pre-payment due date notification. The enterprise's user account may comprise a plurality of users (people) and a plurality of devices, each user and each device may each be associated with multiple attributes that may be employed to determine which, if any, tier or iteration of notifications (initial, subsequent/elevated, final) is to be sent to each user associated with the enterprise's account, and/or to each device (independent of user) associated with the enterprise's account. In an embodiment, the plurality of devices associated with the enterprise's account may be associated with device attributes such as model number, operating system, associated service plan, or other attributes associated with user equipment. Users in an enterprise may not only be associated with varying devices, but may also be associated with various levels of access to subscription services, and this access may be an attribute employed in sending notifications. That is, if an enterprise subscribes to subscription services A, B, C, and D, a first group or tier of users may have access to services A and B, a second group to B and C, and a third group to A, B, and D. This information may be employed by the subscription service to determine which services and/or devices to send initial, elevated, and final notifications to, either based on the amount of use of the services, or based upon the number of users granted access, or in some cases based upon a combination of attributes.

In some embodiments, a plurality of subscription services may be ranked by the user (account holder) or the telecommunications services provider, which may be based on input from the developers/owners of, for example, subscription services L, K, and T. This ranking may also be referred to as a hierarchy, and may be established because a service such as email or messaging may be valued more by the user or determined to be of more value by the telecommunications services provider than services associated with gaming or photography.

In this embodiment, certain subscription services may be assigned rankings that determine (1) which are to display a notification in response to execution depending upon whether it is an initial notification, iteration of an elevated notification, or final notification, (2) which functionalities of the subscription services or which total subscription services' access will be restricted as the notifications progress. "Total" restriction may mean that the user is unable to execute the application because a notification is displayed in response to an execution attempt and the notification display itself blocks access to the subscription service, either by disabling active areas that could otherwise be selected or by taking up a portion of the screen that inhibits user access. In an embodiment, the modification of subscription services may restrict the time of day the subscription service can be accessed, the amount of time the subscription service may be accessed for, the data usage or download rate, the functionalities (e.g., restricting the ability of in-app purchases) of the subscription service, or other aspects of subscription services execution and use specific to the type of subscription services. In some embodiments, restricting the functionality comprises at least one of restricting subscription service access during a time of day, restricting subscription service access during a day of the week, establishing a maximum amount of time the subscription service may be accessed for, establishing a maximum data usage, establishing a maximum download rate, and restricting the ability (purchase amount, frequency, type of purchase) to make purchases using the subscription service.

FIG. 1 is a block diagram of a system 100 according to embodiments of the present disclosure. In an embodiment, the system 100 comprises a server 102 that may be a telecommunication services provider's server 102. The server 102 may comprise at least one non-transitory memory 104 that comprises a plurality of applications, including an application 106 that is executable by a processor 108 to send a plurality of payment notifications. In some embodiments, the application 106 may also be described as a cluster or aggregation of modules, with each module addressing a different stage of payment notification, e.g., pre-payment due date, initial notification after due date, elevated notifications, and final notification.

The server 102 is in communication with a plurality of data stores 110. The plurality of data stores 110 may store information associated with a plurality of user accounts, where each account may be associated with a contract comprising a plurality of contract terms for service and payment, and a plurality of user information for at least one user associated with the account. The plurality of user information may include multiple points of contact, including devices associated with the user and/or the account, as well as subscription services, and attributes that may be associated with a user and/or a particular piece of user equipment. If the user account is associated with a plurality of users, such as a family or friend group or an enterprise, each user may be associated with at least one device and at least a subset of the plurality of subscription services associated with the user account.

In one example, a notification may be sent to a mobile phone of user X, a desktop computer of user X, and a desk phone of user Y, and in another example, the notification may displayed when user Y accesses email and a web browser and when user X attempts to access voicemail. Thus, cross-platform notification enables the same payment notification, or rather the same level (initial, elevated, final) of notification, to be sent to multiple users across multiple devices associated with each user and/or subscription services associated with each user, including mobile phones, desktops, laptops, desk phone, and other devices, and/or email accounts, web browsers, and other subscription services.

The server 102 may be in communication with a plurality of client devices 114 by way of a network 112 that may be supported by the telecommunications service provider associated with the server 102. An example client device 114 may comprise a memory 116, an at least one application 122 stored in the memory 116, a processor 118 configured to execute the application 122, a graphical user interface 120 that may comprise a plurality of configurations depending on the device, as well as be enabled for communication with the network 112 via, for example, Bluetooth® 126 or Wi-Fi 124. In an embodiment, at least some of a plurality of servers 128 may be associated with providers of subscription services and/or other telecommunications service providers or other vendors, and the plurality of servers 128, each comprising a memory illustrated by memory 130, may be configured to communicate via the network 112 or other communication methods. Information such as contractual payment obligations (bills, payment schedule, minimum payments associated with various levels of service/service restoration/service restriction) and payment status may be maintained on the server 102 and/or on the plurality of servers 128 and communicated to the server 102. In an embodiment, there may be applets (not pictured) stored in the memory 104 and in the memory 116 of the client device 114. The applet (not pictured) on the client device 114 may be part of the application 122 and may be configured to receive notifications from the application 106 and may be configured to display the notification on predetermined percentages of a GUI 120, and/or for a predetermined time, and the applet may present the notification including a direct payment link to the vendor of the services associated with the delinquent bill (e.g., the vendor could be a third party provider of subscription services or the telecommunications provider associated with a user account, and the link is configured to direct the user to the payment site for that vendor).

In some embodiments, the client device 114 may comprise a functionality that enables streaming of messages not only on the face of the graphical user interface, but also on an edge or other portion of the client device 114. The at least one application 122 may comprise a subscription service or may represent a bundle of subscription services 122 accessible from the client device 114 and/or from multiple devices (not pictured) that may be supported by telecommunications service providers other than the provider associated with the support of the client device 114. The application 106 may be configured to determine when a payment is about to be due on an account and send a pre-payment notification to the client device 114 and/or other devices associated with the user account.

If no satisfactory payment is received by the due date or within a predetermined grace period of the due date, an initial payment notification may be sent by the application 106 to one or more client devices 114 and, in some embodiments, to one or more subscription services associated with the account. In the example where the user account is an enterprise account, the initial notification and other notifications may be sent to one or more subscription services associated with the user account for the enterprise, or to subscription services associated with individual users associated with the enterprise's user account. If the application 106 determines that no satisfactory payment is received within a predetermined time period of the initial notification, an at least one elevated notification is sent. The at least one elevated notification may be sent to additional client devices including 114 and/or users by way of subscription services 122, where the notification is displayed either when a user interacts with a supported device or with a subscription service on any device capable of accessing the subscription service(s). The notifications including the elevated notifications may be sent to one or more device type of devices that may or may not be associated with the telecommunications service provider associated with the server 102. The device types may comprise mobile phones, tablets, laptops, kiosks, wearable technology (e.g., wearable computers and headset computers), desktop computers, personal digital assistants (PDAs) or other devices capable of and/or configured to access some or all of the subscription services 122. The notifications discussed herein may be displayed so as to take up a portion of a graphic user interface and/or be displayed as to restrict access to the device for a predetermined period of time. In various embodiments, the predetermined period of time may comprise 3 seconds, 5 seconds, 10 seconds, 30 seconds, 60 seconds, or more. As additional notifications are sent in the absence of a satisfactory payment being received, the percentage of the graphic user interfaces occupied by the notifications may increase, the predetermined period of time may increase, and access to the subscription services may be modified as discussed herein.

If a predetermined number of iterations of elevated notifications are sent to the user account, either to devices and/or for display by subscription services associated with the user account, and a satisfactory payment is still not received within a predetermined time period, the application 106 may send a final notification. In some embodiments, the final notification may be sent a larger number of user devices and/or subscription services than previous notifications. The application 106 may restrict access to the subscription services (regardless of the devices used to access the services) and to all but emergency functions on the devices either upon sending the final notification or in response to a determination that a satisfactory payment has not been received within a predetermined time period of the final notification. The predetermined number of iterations of elevated notifications may be determined based upon information associated with the user account including payment history and any associated credit rating or ratings or indications of bankruptcy filings. Each user account may have a rating or score associated with it that may be employed to determine the predetermined number of iterations of the elevated notifications to be sent in the event that a payment due date is missed. Device access and subscription service access and functionalities may be restored by the application 106 or by other systems and servers associated with the telecommunications service provider if a satisfactory payment is received.

It is appreciated that there may be an initial notification sent once a payment due date is missed, then at least one subsequent (elevated) notification, and then a final notification. Sending a final notification may simultaneously trigger all access to devices and subscription services to be restricted (for example, to emergency functions) and the account may be put into arrears. In other embodiments, failure to make a satisfactory payment to the account within a predetermined grace period after the final notification may trigger the loss of access. A "subsequent notification" may be a notification sent after an initial payment notification, which may be sent a predetermined time after payment is due, and which is not a final notification. In contrast, a "final notification" is the last notification sent by the telecommunications service provider prior to services for devices or access to subscription services being terminated and wherein the user may only access emergency functions on devices associated with the delinquent account and may not be able to access subscription services.

In an embodiment, after an initial notification is sent and in response to a determination that a satisfactory payment was not received prior to another predetermined date, at least one elevated notification may be sent to the same group or to a different/additional group of users. As discussed above in the individual user example, this notification may be sent to supported devices in the form of a display that blocks access to progressively more (larger percentage) of the screen. In one example, an initial notification may cause the graphical user interface to display a notification on 33% of the screen, a subsequent (elevated) notification may display on 50% of the screen, a second subsequent (elevated) notification may display on 75% of the screen, and a final notification may be displayed on 90% of the screen, only permitting the user to access emergency functions.

In an alternate embodiment, an initial notification may be displayed on any or all of subscription services L, K, and T when the users selected to receive the notification attempt to execute the subscription services. Notifications sent to subscription services may be sent for display when any user associated with an account attempts to access the service, or when a predetermined group of users (as determined by user attributes), attempts to access the subscription services. In some embodiments, the initial notification may appear when a first number of subscription services are executed, and elevated and final notifications may be presented on additional and in some cases on an increasing number of subscription services (first on subscription service L for the initial notification, then subscription services L and K for an elevated notification, then subscription services L, K, and T for a further elevated notification) when those subscription services are attempted to be accessed by users selected to receive the notifications. This cross-platform notification system 100 spans device types, device support carriers (telecommunications services providers that support the various device types), users, subscription services types, and may be used in conjunction with messaging subscription services and other subscription services that may be standard to devices as determined by the device manufacturer, downloaded by the user, as well as those pushed by the telecommunications services provider that may be dedicated to this tiered, cross-platform notification system. Device types may comprise mobile phones, tablets, laptop computers, desktop computers, kiosks, workstations, personal digital assistants (PDAs), e-readers, wearable technology (e.g., wearable computers and headset computers), and other computing devices that may be supported by telecommunications service providers and/or otherwise act as access points (portals) for subscription services.

In an embodiment, an initial notification may be sent to group 1, comprising 10 users selected based on attributes as discussed herein, and a first elevated notification may be sent to group 2, comprising 20 users associated with additional attributes as compared to group 1. Group 1 may include system administrators and management, who may also continue to receive elevated and final notifications if payment is not received. Group 2 may comprise additional users associated with an attribute, either more senior users (director level or otherwise above the management level), or may merely be a larger number of users decided alphabetically or otherwise than the number who received the initial notification in group 1.

Figure 2:
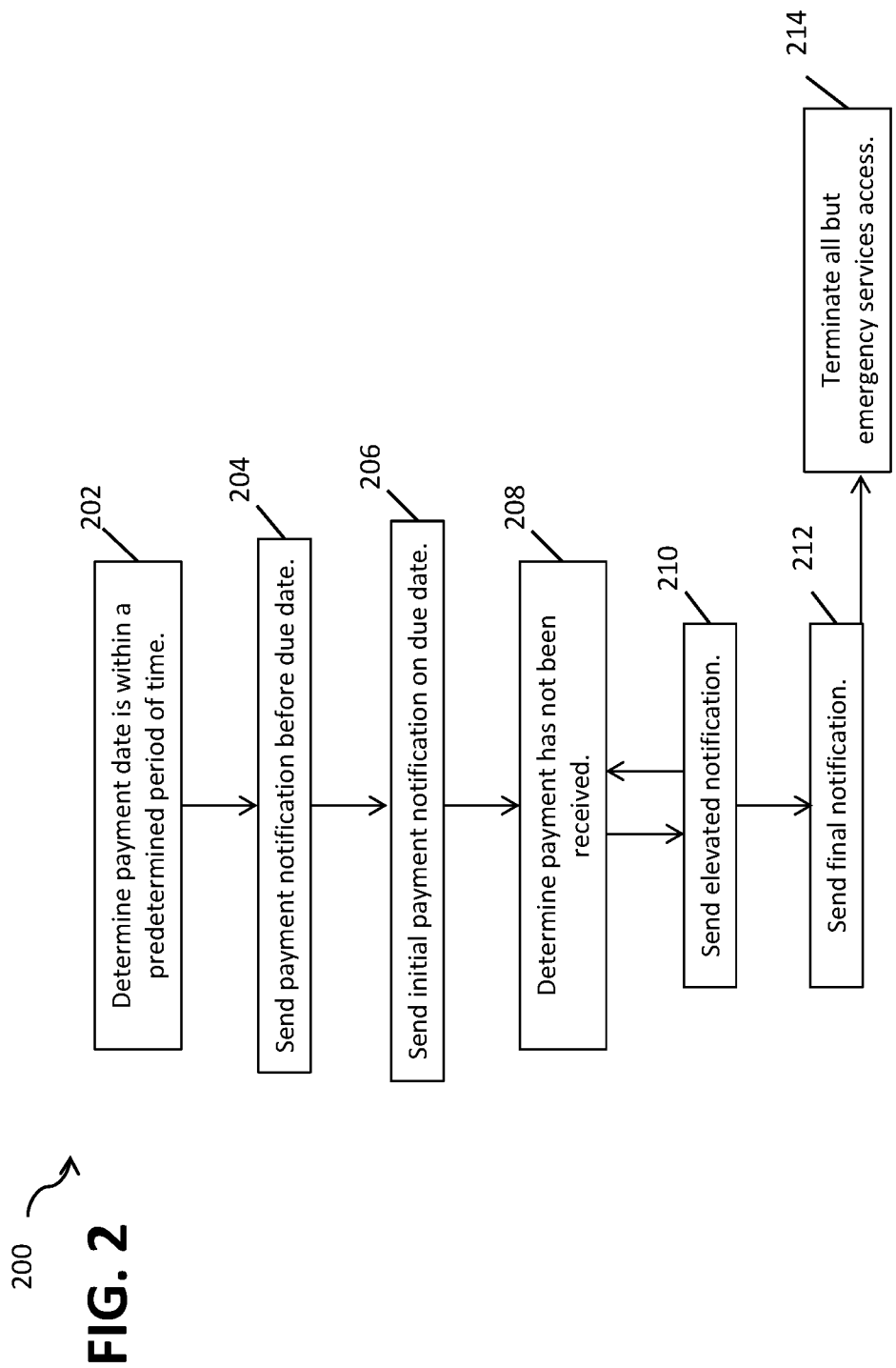
FIG. 2 is a flow chart of a method of maintaining customer service according to an embodiment of the present disclosure.

FIG. 2 is a flow chart of a method of maintaining customer service according to an embodiment of the present disclosure. In the method 200, a user account was previously created and associated with subscription services offered by the telecommunications services provider as well as with subscription services from third parties for which access is provided by, promoted, and/or enabled by the account's association with the telecommunications service provider. The account may be associated with a weekly, bi-weekly, monthly, bi-monthly, quarterly, bi-annual, annual, or other payment schedule, at which times a complete or a minimum payment may be due. This payment may be due in order to not only maintain access to subscription services provided by the telecommunications services provider but also access to the subscription services provided by third parties through the telecommunications service provider, which may be due in part to the fact that the subscription services are accessed via voice, data, and other services provided by the telecommunications provider. For example, Internet access to an electronic web site or a premium service such as streaming video may be delivered over a data service provided by the telecommunications service provider, and therefore loss of data service would entail loss of internet access and/or streaming video service as well. In some embodiments, the plurality of servers 128 from FIG. 1 may provide information regarding payments due, payment modifications, and payments delinquent to the server 102.

In an embodiment of the method at block 202, an application such as the application 106 discussed in FIG. 1, stored on a non-transitory memory of a server that may be a telecommunications service provider's server, may determine that a payment is coming due for a customer account, e.g., that a due date has not passed but is impending within a predetermined amount of time. The application 106 may, in response to this determination, send a pre-due-date payment notification at block 204 to at least one telecommunications device associated with the customer account. In alternate embodiments, the notification may also be sent to at least one subscription service. At block 206, in response to a determination that payment of the account has not been made in full, the application 106 may send a payment notification on the date the payment is due, this may be referred to as the initial notification.

The determination as to whether the payment due may be based upon a contractual agreement between the user and the telecommunications service provider and/or third parties. In some embodiments, the application 106 may determine if a minimum partial payment has been made, which may be referred to as a "satisfactory payment," and may maintain a full level of service. A "full level" of service may comprise unmitigated and unrestricted access to subscription services, or may refer to a level of service defined by contract terms that is ensured if the user makes a minimum payment at periodic intervals. In alternate embodiments, the application 106 may only maintain the user's full level of service if a full payment was received within a predetermined time period. In an alternate embodiment, partial service may be maintained. "Partial service" or a "partial level of service" may be the term or terms used to describe the access enabled to some devices and/or subscription services, including but not limited to emergency functions), if less than a satisfactory payment per the contract terms is made.

In the embodiment where the user is an individual user, the initial notification at block 206 may be sent to a single device, e.g., the device associated with the account. In an alternate embodiment where the account represents a plurality of users (e.g., a group plan for personal or business use), the initial notification at block 206 may be sent to at least one user, to a tier of users (e.g., IT system administrators or accounts payable), or a plurality of users based upon an attribute of those users (role, seniority, access to a payment option). At block 208, a determination is made by the application 106 whether the payment as dictated by the applicable contract associated with the account was received within a predetermined number of days from (after) the payment was due. At block 210, in response to a determination at block 208 that the payment was not received within the predetermined time period, the application 106 may perform at least one of several actions. These actions may comprise modifying access and/or functionality to at least some of the subscription services and/or sending an elevated payment notification. In an embodiment, modifying the at least some of the plurality of subscription services may comprise at least one of restricting access to the graphic user interface of a device when the subscription services access is attempted, or restricting functionality of at least one subscription services, including limiting the time of day or amount of time or data usage permitted, as well as restricting in-service purchases by amount, frequency, or another measure.

In an embodiment, the elevated payment notification is sent to both the same device(s) that the notifications were sent to at blocks 204 and 206 as well as additional devices associated with the account. In an alternate embodiment the elevated payment notification is sent to either the same device(s) that the notifications were sent to at blocks 204 and 206 in addition to additional devices associated with the account, and/or the elevated payment notification at block 210 may be sent to at least one subscription service associated with the account. Subsequent to the elevated payment notification being sent at block 210, when a user attempts to execute/access the application on any device, regardless of whether that device is associated with the account, the elevated notification appears.

In one example, an initial notification sent at block 206 may cause the graphical user interface to display a notification on 33% of the screen, and an elevated notification sent at block 210 may display on 50% of the screen. In an embodiment, one or more elevated payment notifications may be sent iteratively, where blocks 208 and 210 are repeated for a predetermined number of cycles (iterations) until a satisfactory payment is made or until the predetermined number of cycles is completed in the absence of payment, at which point the method 200 proceeds to block 212 as discussed below. This predetermined number of cycles may be determined based on contract terms and/or based on how many previous payments were delinquent or not paid in full, or if any previous payments are outstanding.

During one or more of these iterations, if an elevated payment notification is sent to at least one device, the notification may be configured to take up a first percentage of the user interface, and further (iterative) elevated notifications may be configured to take up progressively more (a larger percentage) of the user interface, and/or the notifications may be configured to be displayed for increasingly longer periods of time. In an embodiment, a second elevated notification may be sent after a subsequent iteration between blocks 208 and 210 may display on 75% of the screen, and a final notification as discussed below at block 212 may be displayed on 90% of the screen, only permitting the user to access emergency functions.

In an embodiment, the notifications sent at blocks 204, 206, and 210 may be sent to devices and/or displayed by way of subscription services based on the contract's terms. These contract terms may include that some or all notifications are sent based on at least one attribute associated with each device and/or each user that is associated with the account. In an embodiment, each device is associated with at least one user of the plurality of users, and each device associated with a user account may be associated with at least one device attribute including a model number, an operating system, an associated service plan/contract, or other attributes associated with user equipment, including a device type (tablet, mobile phone, personal digital assistant, laptop, etc.).

In one example, a user account may have a plurality of devices associated with it, and each device may be associated with the same service plan or with variations of a service plan under a single contract, the varying service plans may allow for differing access to and functionalities within subscription services. At least one user attribute may be associated with each user associated with the user account as well, the user attributes may comprise a job description, a job tier, a payment permissions level (e.g., does the user receiving the notification have the authority to make a satisfactory payment), a plurality of subscription services available for access by the user (which may be the same as or less than the total number of subscription services associated with the user account).

In an embodiment, an attribute that may be used to determine notification destinations may identify a predetermined number of devices, alone or in combination with a user or a device attribute as discussed above. For example, an initial notification may be sent to a first number of users or a first percentage of users who are also associated with a first device attribute and a first user attribute, and an elevated notification is to be sent to a second, greater number or second, greater percentage of users that may be associated with a first device attribute and a first user attribute in addition to additional device or user attributes. It is appreciated that the difference between sending any notification (pre-payment, initial, elevated, final) to a device and sending it based on subscription services is that the subscription service may be accessed on any device, e.g., not only a device supported by the telecommunications service provider to which payment is owed. Therefore, a user may see a notification when they interact with devices associated with the user account and/or when a particular subscription service is accessed (or access is attempted) from any device capable of accessing subscription services, such devices may not necessarily be associated with the user account or supported by the same telecommunications service provider.

At block 212, in response to a determination by the application 106 that a satisfactory payment has not been received after the predetermined number of iterations, a final notification is sent. This final notification may be sent to one or more devices as well as subscription services, and may be sent to a different group or a group that overlaps with at least some notifications sent during the iterative process at blocks 208 and 210. At block 214, in response to a determination that a satisfactory payment has not been received within a predetermined time period of sending the final notification at block 212, all but emergency functions may be restricted. This may mean that an individual user cannot access anything on their device except for emergency functions, and that attempts to access subscription services from other devices that are supported by telecommunications service providers to whom payment may not be owed and or delinquent will be unsuccessful. Depending upon the subscription service, a notification may be displayed when access is attempted that comprises a link to a web portal or a phone number where payment may be made in order to restore some or all service to the account. In an alternate embodiment, when an account is associated with an enterprise, the termination of services at block 214 may mean that no user associated with the delinquent account is able to user their device(s) except for emergency functions, and that subscription service access may also be restricted as described above. One difference between an individual (including a family) account and an enterprise account is that there may be multiple parties or tiers/groups of users authorized to make a payment for an enterprise account, whereas an individual or family account may have a single point of payment access, or generally less parties able to make the payment.

Figure 3:
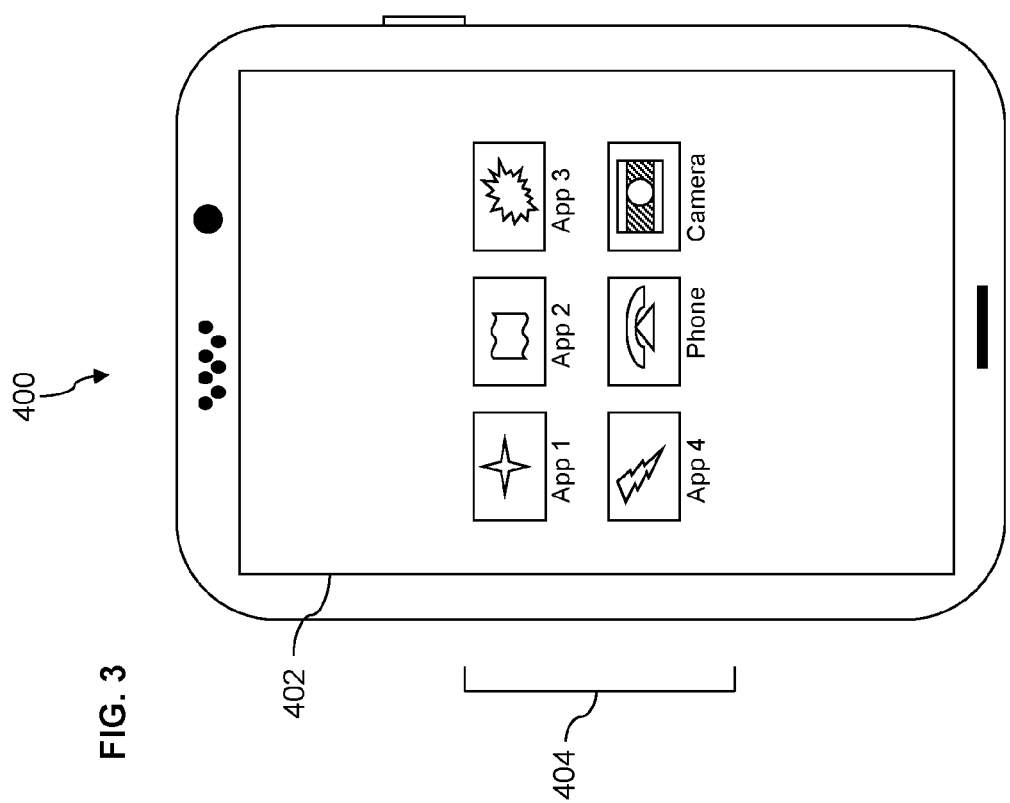
FIG. 3 is an illustration of a user equipment according to an embodiment of the present disclosure.

FIG. 3 depicts the user equipment (UE) 400, which is operable for implementing aspects of the present disclosure, but the present disclosure should not be limited to these implementations. Though illustrated as a mobile phone, the UE 400 may take various forms including a wireless handset, a pager, a personal digital assistant (PDA), a gaming device, or a media player. The UE 400 includes a touch-screen display 402 having a touch-sensitive surface for input by a user. A small number of application icons 404 are illustrated within the touch screen display 402. It is understood that in different embodiments, any number of application icons 404 may be presented in the touch screen display 402. In some embodiments of the UE 400, a user may be able to download and install additional applications on the UE 400, and an icon associated with such downloaded and installed applications may be added to the touch screen display 402 or to an alternative screen. The UE 400 may have other components such as electro-mechanical switches, speakers, camera lenses, microphones, input and/or output connectors, and other components as are well known in the art. The UE 400 may present options for the user to select, controls for the user to actuate, and/or cursors or other indicators for the user to direct. The UE 400 may further accept data entry from the user, including numbers to dial or various parameter values for configuring the operation of the handset. The UE 400 may further execute one or more software or firmware applications in response to user commands. These applications may configure the UE 400 to perform various customized functions in response to user interaction. Additionally, the UE 400 may be programmed and/or configured over-the-air, for example from a wireless base station, a wireless access point, or a peer UE 400. The UE 400 may execute a web browser application which enables the touch screen display 402 to show a web page. The web page may be obtained via wireless communications with a base transceiver station, a wireless network access node, a peer UE 400 or any other wireless communication network or system.

Figure 4:
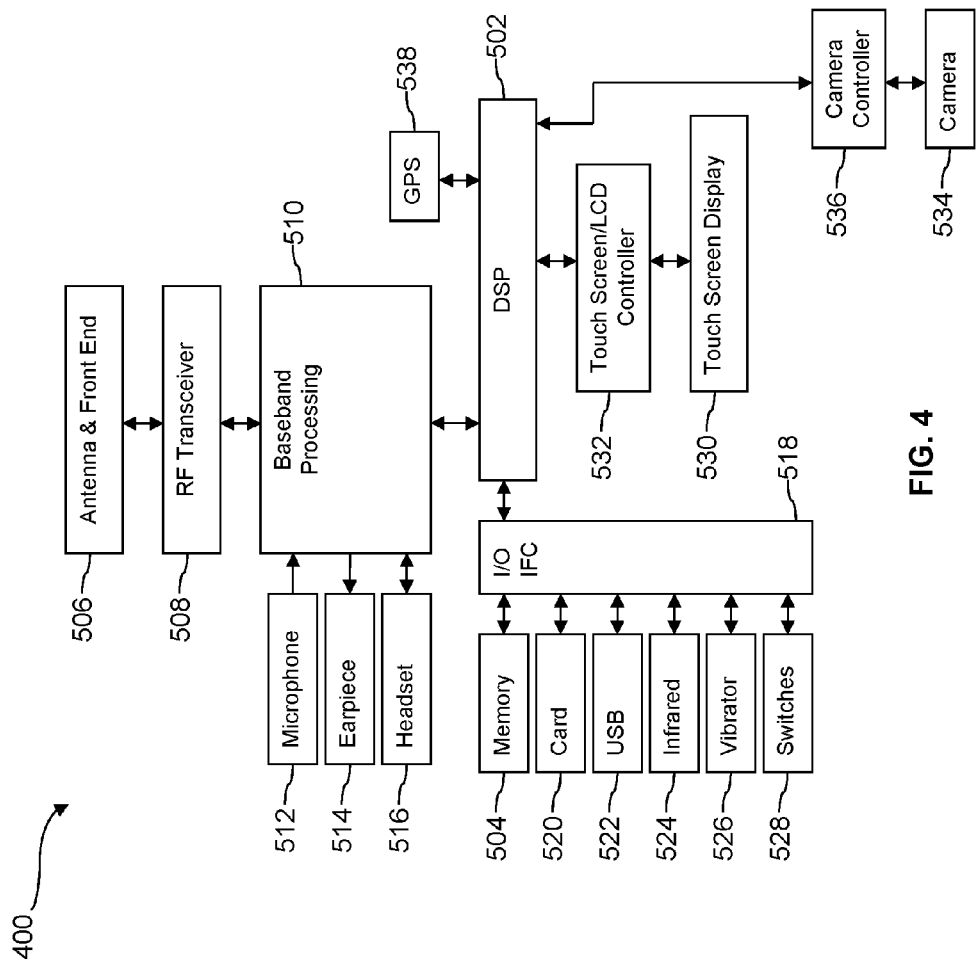
FIG. 4 is a block diagram of the user equipment according to an embodiment of the present disclosure.

FIG. 4 shows a block diagram of the UE 400. While a variety of known components of handsets are depicted, in an embodiment a subset of the listed components and/or additional components not listed may be included in the UE 400. The UE 400 includes a digital signal processor (DSP) 502 and a memory 504. As shown, the UE 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, one or more electro-mechanical switches 528, a touch screen liquid crystal display (LCD) with a touch screen display 530, a touch screen/LCD controller 532, a camera 534, a camera controller 536, and a global positioning system (GPS) receiver 538. In an embodiment, the UE 400 may include another kind of display that does not provide a touch sensitive screen. In an embodiment, the UE 400 may include both the touch screen display 530 and additional display component that does not provide a touch sensitive screen. In an embodiment, the DSP 502 may communicate directly with the memory 504 without passing through the input/output interface 518. Additionally, in an embodiment, the UE 400 may comprise other peripheral devices that provide other functionality.

The DSP 502 or some other form of controller or central processing unit operates to control the various components of the UE 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the UE 400 to function as a peripheral device to exchange information with a personal computer or other computer system. The infrared port 524 and other optional ports such as a Bluetooth® interface or an IEEE 802.11 compliant wireless interface may enable the UE 400 to communicate wirelessly with other nearby handsets and/or wireless base stations. In an embodiment, the UE 400 may comprise a near field communication (NFC) transceiver. The NFC transceiver may be used to complete payment transactions with point-of-sale terminals or other communications exchanges. In an embodiment, the UE 400 may comprise a radio frequency identify (RFID) reader and/or writer device.

The switches 528 may couple to the DSP 502 via the input/output interface 518 to provide one mechanism for the user to provide input to the UE 400. Alternatively, one or more of the switches 528 may be coupled to a motherboard of the UE 400 and/or to components of the UE 400 via a different path (e.g., not via the input/output interface 518), for example coupled to a power control circuit (power button) of the UE 400. The touch screen display 530 is another input mechanism, which further displays text and/or graphics to the user. The touch screen LCD controller 532 couples the DSP 502 to the touch screen display 530. The GPS receiver 538 is coupled to the DSP 502 to decode global positioning system signals, thereby enabling the UE 400 to determine its position.

Figure 5A:
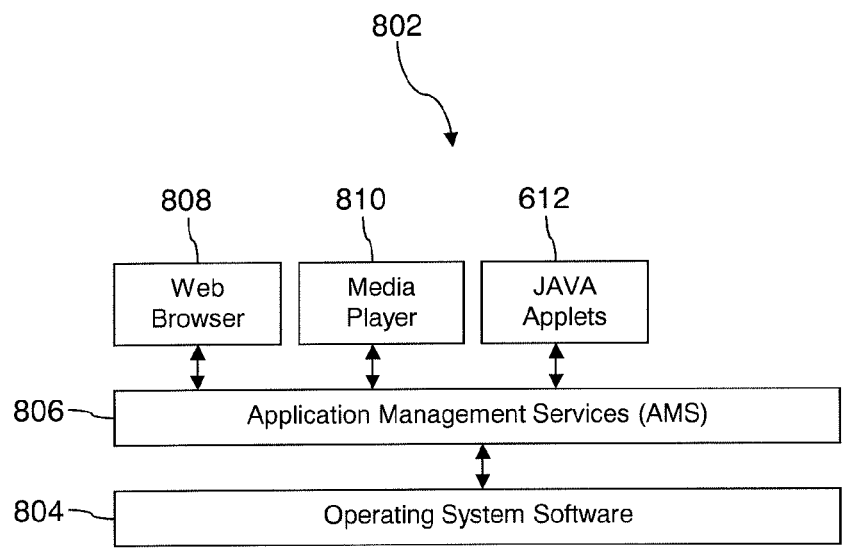
FIG. 5A is a block diagram of a software environment of a user equipment according to an embodiment of the present disclosure.

FIG. 5A illustrates a software environment 802 that may be implemented by the DSP 502. The DSP 502 executes operating system software 804 that provides a platform from which the rest of the software operates. The operating system software 804 may provide a variety of drivers for the handset hardware with standardized interfaces that are accessible to application software. The operating system software 804 may be coupled to and interact with application management services (AMS) 806 that transfer control between applications running on the UE 400. Also shown in FIG. 5A are a web browser application 808, a media player application 810, and JAVA applets 812. The web browser application 808 may be executed by the UE 600 to browse content and/or the Internet, for example when the UE 400 is coupled to a network via a wireless link. The web browser application 808 may permit a user to enter information into forms and select links to retrieve and view web pages. The media player application 810 may be executed by the UE 400 to play audio or audiovisual media. The JAVA applets 812 may be executed by the UE 400 to provide a variety of functionality including games, utilities, and other functionality.

Figure 5B:
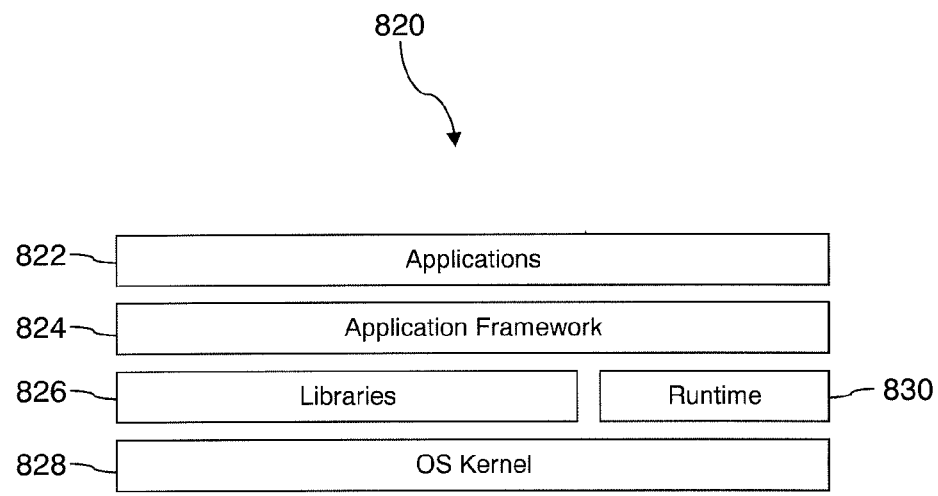
FIG. 5B is a block diagram of an alternative software environment of a user equipment according to an embodiment of the present disclosure.

FIG. 5B illustrates an alternative software environment 820 that may be implemented by the DSP 502. The DSP 502 executes operating system kernel (OS kernel) 828 and an execution runtime 830. The DSP 702 executes applications 822 that may execute in the execution runtime 830 and may rely upon services provided by the application framework 824. Applications 822 and the application framework 824 may rely upon functionality provided via the libraries 826.

Figure 6:
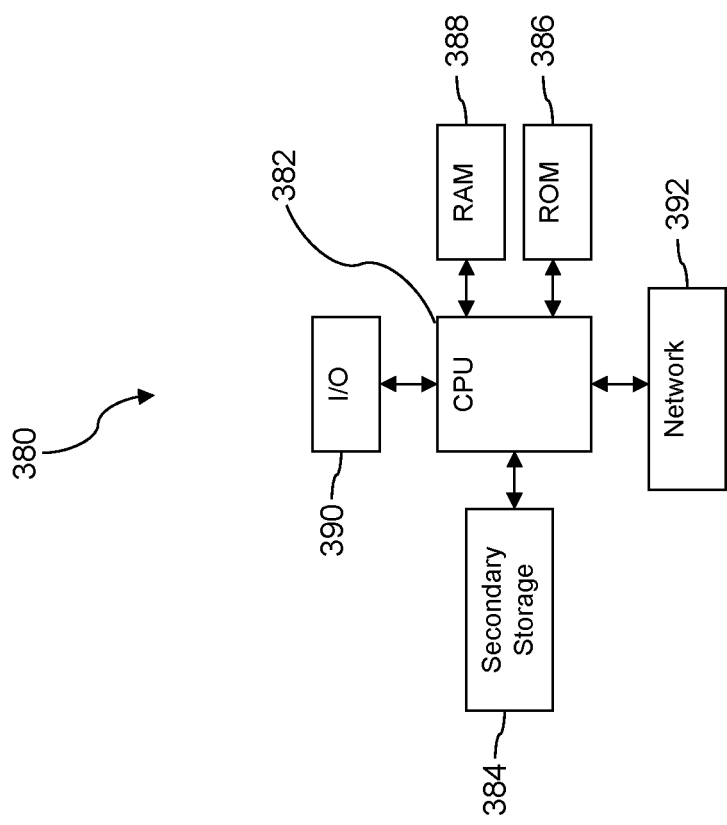
FIG. 6 is a block diagram of a computer system according to embodiment of the present disclosure.

FIG. 6 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embodied in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of maintaining telecommunications service comprising:

sending, by an application stored in a non-transitory memory, based on a determination that payment is due on a user account, an initial payment notification to at least one device associated with the user account, wherein the at least one user device comprises a mobile phone and is associated with a telecommunications service provider, wherein the initial payment notification is displayed on a first portion of a graphic user interface of the mobile phone, and wherein the user account is associated with the mobile phone and a plurality of subscription services;

based on a determination that a satisfactory payment has not been received within a predetermined period of time:

modifying, by the application, at least one of the plurality of subscription services, wherein modifying the at least one of the plurality of services comprises at least one of restricting access to a graphic user interface when a request for access to the at least one of the plurality of subscription services is received and restricting a functionality of the at least one of the plurality of subscription services; and sending, by the application, at least one elevated payment notification to the mobile phone and an at least one subscription service of the plurality of subscription services, wherein the elevated payment notification is displayed on a second portion of the mobile phone, wherein the second portion is greater than the first portion, and wherein the elevated payment notification is displayed in response to a request for access to the at least one subscription service;

sending, by the application, a final payment notification in response to a determination that a satisfactory payment has not been made within a predetermined time period of the at least one elevated payment notification; and disabling, by the application, in response to a determination that a satisfactory payment is not received within a predetermined time period after the final payment notification is sent, access to the mobile phone and the plurality of subscription services.

2. The method of claim 1, wherein the plurality of subscription services are associated with a plurality of vendors other than the telecommunications service provider and comprise messaging clients, email clients, retail applications, and geolocation services.

3. The method of claim 2, wherein restricting the functionality comprises at least one of: restricting subscription service access during a time of day, restricting subscription service access during a day of the week, establishing a maximum amount of time the subscription service may be accessed for, establishing a maximum data usage, establishing a maximum download rate, and restricting the ability to make purchases using the subscription service.

4. The method of claim 1, wherein the elevated payment notification is sent to the mobile phone and another device associated with the user account.

5. The method of claim 4, wherein the elevated payment notification is sent to the mobile phone and the another device based upon an attribute associated with at least one of each device and an attribute associated with a user associated with each device.

6. The method of claim 1, wherein the user account is a corporate account associated with a plurality of users, and wherein the initial payment notification is sent to a plurality of devices associated with the plurality of users associated with the user account.

7. The method of claim 5, wherein the device attribute is one of a model number, an operating system, a device type, and a service plan associated with the device.

8. The method of claim 7, wherein the user attribute is one of a job description, a job tier, a payment permissions level, and a subset of the plurality of subscription services available for access by the user.

9. The method of claim 1, wherein the elevated payment notification is sent to at least two subscription services of the plurality of subscription services.

10. A system for maintaining telecommunications service comprising:

a data store stored in a non-transitory memory of a server and comprising a plurality of user accounts, wherein each user account of the plurality of user accounts is associated with at least one user, at least one device, and a plurality of subscription services;

a plurality of remote servers associated with providers of the plurality of subscription services;

a payment notification application stored in the non-transitory memory that, when executed by a processor;

sends, to a first device associated with the user account, an initial payment notification, wherein the initial payment notification is displayed on a first portion of a graphic user interface of the first device;

based on a determination that a satisfactory payment has not been received within an initial time period, modifies access to at least one of the plurality of subscription services by at least one of restricting access to a graphic user interface when a request for access to the at least one of the plurality of subscription services is received and restricting a functionality of the at least one of the plurality of subscription services, and sends, to the first device and a second device associated with the user account, based on the determination that satisfactory payment has not been received within the initial time period, a subsequent payment notification, wherein the first device and the second device comprise different types of devices, wherein the subsequent payment notification is displayed on a second portion of the graphical user interface, and wherein the second portion is greater than the first portion;

sends, to at least one subscription service of the plurality of subscription services associated with the user account, based on a determination that satisfactory payment has not been received within a second time period, a second subsequent payment notification, wherein the second subsequent payment notification is displayed on a graphical user interface of a device configured to access the at least one subscription service in response to execution of the at least one subscription service;

sends, to the first device and the second device and to the at least one subscription service, a final payment notification in response to a determination that a satisfactory payment has not been made within a predetermined time period of the second subsequent payment notification; and disables, by the application, in response to a determination that a satisfactory payment is not received within a predetermined time period after the final payment notification is sent, access to the plurality of subscription services and the first device and the second device.

11. The system of claim 10, wherein the application restores, in response to a determination that a satisfactory payment has been made, at least a portion of access to the first device and the second device and access to the at least one subscription service.

12. The system of claim 10, wherein at least one user account of the plurality of user accounts is associated with a plurality of users, and wherein each user is associated with at least some subscription services of the plurality of subscription services associated with the at least one user account.

13. The method of claim 10, wherein modifying the at least one of the plurality of subscription services comprises at least one of restricting access to a graphic user interface when the request for access to the at least one of the plurality of subscription services is received and restricting a functionality of the at least one of the plurality of subscription services.

14. The method of claim 13, wherein restricting the functionality comprises at least one of: restricting subscription service access during a time of day, restricting subscription service access during a day of the week, establishing a maximum amount of time the subscription service may be accessed for, establishing a maximum data usage, establishing a maximum download rate, and restricting the ability to make purchases using the subscription service.

15. The method of claim 10, wherein the payment notification application is in communication with at least some of the plurality of remote servers, receives information from the at least some of the plurality of remote servers, and sends at least one notification based upon the information received, and wherein the first device and the second device each comprise an applet configured to display notifications sent by the payment notification application.

16. A method of maintaining telecommunications service comprising:
sending, by an application stored in a non-transitory memory, based on a determination that payment is due on a user account, an initial payment notification to at least one device associated with the user account, wherein the initial payment notification is displayed on a first portion of a graphic user interface of the at least one device, wherein the at least one device comprises a mobile phone, and wherein the user account is associated with the mobile phone and a plurality of subscription services;
based on a determination that a satisfactory payment has not been received within a predetermined period of time:
modifying, by the application, at least one of the plurality of subscription services, wherein modifying the at least one of the plurality of services comprises at least one of restricting access to a graphic user interface when a request for access to the at least one of the plurality of subscription services is received or restricting a functionality of the at least one of the plurality of subscription services; and sending, by the application, at least one elevated payment notification to the mobile phone and at least two other devices associated with the user account, based on at least one attribute associated with the mobile phone and each of the at least two other devices, wherein the at least one elevated payment notification is displayed on a second portion of a graphical user interface of the mobile phone and each of the at least two other devices, and wherein the second portion is greater than the first portion;

sending, by the application, a final payment notification in response to a determination that a satisfactory payment has not been made within a predetermined time period of the at least one elevated payment notification, wherein the final payment notification is sent to the mobile phone, the at least two other devices and a subset of the plurality of subscription services associated with the user account; and disabling, by the application, in response to a determination that a satisfactory payment is not received within a predetermined time period after the final payment notification is sent, access to the mobile phone and the at least two other devices and the plurality of subscription services.

17. The method of claim 16, wherein the final payment notification is displayed on a third portion of the graphical user interface of the mobile phone and the at least two other devices, wherein the third portion is greater than the second portion, and wherein the final payment notification is displayed on a graphical user interface of a device configured to access each of the subset of the plurality of subscription services in response to execution of each subscription service.

18. The method of claim 17, wherein displaying the final payment notification in response to execution of each subscription service disables access to the subscription service for a predetermined period of time.

19. The method of claim 16, further comprising restoring, by the application, in response to a determination that a satisfactory payment has been received for the user account, access to the mobile phone, the two other devices, and the plurality of subscription services.

20. The method of claim 16, wherein the at least one attribute is one of a model number, an operating system, a device type, and a service plan associated with each of the at least two devices.

* * * * *